(12) United States Patent
Johns

(10) Patent No.: US 8,535,827 B2
(45) Date of Patent: Sep. 17, 2013

(54) SET OF SEPARATORS FOR A LEAD-ACID RECHARGEABLE BATTERY

(75) Inventor: Frank Johns, Sarstedt (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 426 days.

(21) Appl. No.: 12/921,705

(22) PCT Filed: Feb. 20, 2009

(86) PCT No.: PCT/DE2009/000234
§ 371 (c)(1),
(2), (4) Date: Sep. 14, 2010

(87) PCT Pub. No.: WO2009/112006
PCT Pub. Date: Sep. 17, 2009

(65) Prior Publication Data
US 2011/0014511 A1 Jan. 20, 2011

(30) Foreign Application Priority Data
Mar. 11, 2008 (DE) .......................... 10 2008 013 687

(51) Int. Cl.
*H01M 2/18* (2006.01)
*H01M 2/14* (2006.01)
(52) U.S. Cl.
USPC ............................ 429/143; 429/129; 429/144
(58) Field of Classification Search
None
See application file for complete search history.

(56) References Cited

U.S. PATENT DOCUMENTS

| 3,892,620 A | 7/1975 | Heussy |
| 4,080,732 A | 3/1978 | Eberle |
| 4,407,063 A | 10/1983 | Johnson |
| 4,679,316 A | 7/1987 | Simonton |
| 4,927,722 A * | 5/1990 | Bohnstedt et al. ............ 429/147 |
| 5,803,935 A | 9/1998 | Schwetz |
| 2002/0034684 A1* | 3/2002 | Muller-Rinke ............... 429/143 |

FOREIGN PATENT DOCUMENTS

| DE | 32 07 070 A1 | 9/1983 |
| DE | 69209230 | 11/1996 |
| DE | 20221427 | 12/2005 |
| DE | 102006014691 | 8/2007 |
| EP | 1 176 657 A | 1/2002 |
| JP | 2000 182593 A | 6/2000 |
| WO | WO 92/02055 | 2/1992 |

OTHER PUBLICATIONS

English translation of International Preliminary Report on Patentability for International Patent Application No. PCT/DE2009/00234 mailed Oct. 14, 2010.

* cited by examiner

*Primary Examiner* — Barbara Gilliam
*Assistant Examiner* — Adam A Arciero
(74) *Attorney, Agent, or Firm* — Boardman & Clark LLP

(57) ABSTRACT

The invention relates to a method for converting a separator processing machine for processing separators for a lead accumulator, comprising the steps of ending a supply of a first separator having a first separator width to the separator processing machine and supplying a second separator having a second separator width that differs from the first separator width to the separator processing machine. According to the invention, the separators comprise a base film body extending along a center line and a plurality of primary ribs, which are raised above the base film body along the center line by a primary rib height and are disposed mirror-symmetrically with respect to the center line, wherein the primary ribs of the second separator with respect to the center line are disposed in the same locations as the primary ribs of the first separator.

11 Claims, 3 Drawing Sheets

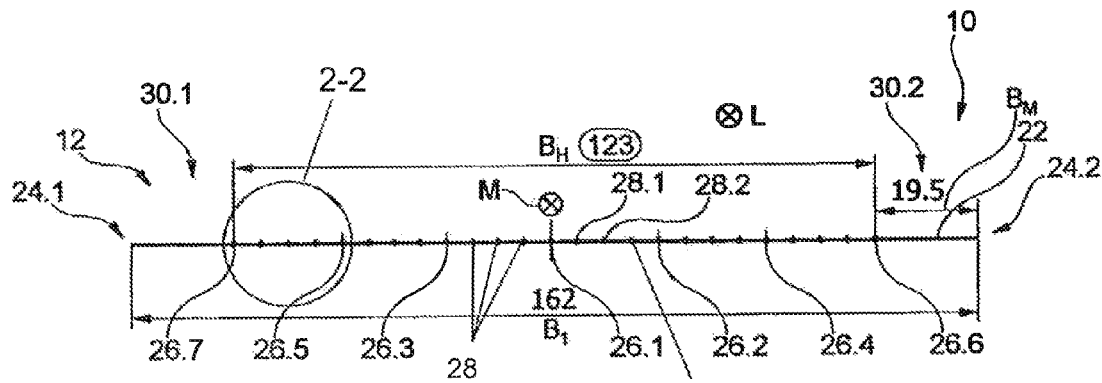
Fig. 1a
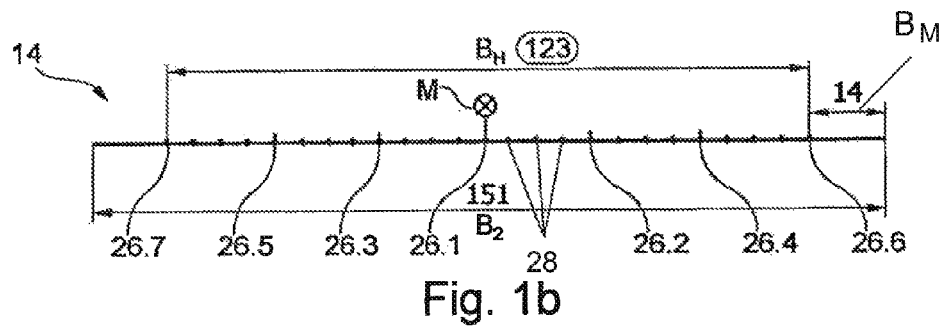
Fig. 1b
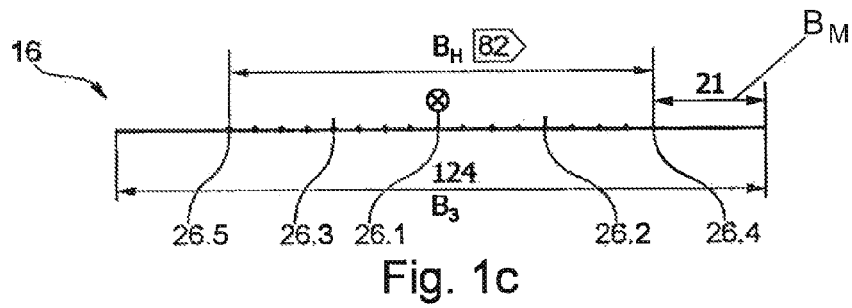
Fig. 1c
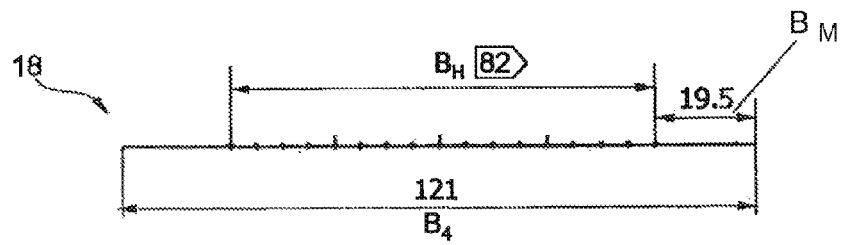
Fig. 1d
Fig. 1

US 8,535,827 B2

SET OF SEPARATORS FOR A LEAD-ACID RECHARGEABLE BATTERY

CROSS-REFERENCE TO RELATED APPLICATIONS

This application claims priority from International Application Serial No. PCT/DE2009/000234, filed Feb. 20, 2009, entitled METHOD FOR CONVERTING A SEPARATOR PROCESSING MACHINE, which claims priority from German Patent Application Serial No. 10 2008 013 687.5, filed Mar. 11, 2008, the contents of which are hereby incorporated in their entirety by reference.

FIELD OF THE INVENTION

The invention relates to a method for converting a separator processing machine for the processing of separators in the form of webs for a lead-acid rechargeable battery.

BACKGROUND

By way of example, separator processing machines are pocket machines, which produce separator pockets from a separator in the form of a web. In the finished lead-acid rechargeable battery, pole plates of a lead-acid rechargeable battery are held in the separator pockets. Pole plates of one polarity are therefore separated from pole plates of the other polarity.

Separator processing machines have a guide apparatus, for example a guide roller, in order to guide the supplied separator. The guide roller has recesses, which engage in the main ribs, for guiding the separator.

When it is intended to produce a lead-acid rechargeable battery with pole plates with a narrower width, then the separator processing machine must be converted. Until now, it has been necessary for this purpose to replace the guide roller, which is time-consuming and expensive.

The invention is based on the object of proposing a method for converting a separator processing machine and a set of separators, by means of which it is possible to convert the separator processing machine to a different separator more quickly.

DE 10 2006 014 691 B3 discloses a lead-acid rechargeable battery and a pocketing method. The method described there has the disadvantage that it is complex to convert the separator processing machine for a separator change. Methods which are known from DE 202 21 427 U1 and DE 692 09 230 T2 have the same disadvantage.

EP 1 176 657 A1 discloses an apparatus for inserting batteries or rechargeable-battery plates into sheaths composed of separator material. In this apparatus, a compartment is provided which is used to hold a sheath. The compartment may be moved from a position in which the sheath is inserted into the compartment to a position in which the sheath accommodated in the compartment is inserted. This makes it easier to insert the plates into the sheaths, which are in the form of flexible tubes. No details are given with regard to possible refinements which make it easier to change from one separator to another.

U.S. Pat. No. 4,407,063 discloses an apparatus and a method for producing pockets for battery plates. No details are given with respect to particularly quickly changing the separator from a first separator to a second.

The invention solves the problem by a method and a separator set, examples which are described herein.

SUMMARY OF THE INVENTION

A method for converting a separator processing machine is provided. The method includes the following steps: (a) ending of a supply of a first separator with a first separator width to the separator processing machine and (b) supplying a second separator with a second separator width, which is different from the first separator width, to the separator processing machine.

A separator set of separators in the form of webs is provided. The separators are designed for separating opposite-polarity electrodes in a lead-acid rechargeable battery and wherein each separator in the separator set has a film base body which extends along a center line, and a plurality of main ribs which project above the film base body by a main rib height along the center line.

BRIEF DESCRIPTION OF THE DRAWINGS

Embodiments of the invention will be explained in more detail in the following text with reference to the attached drawings. In this case, the sub-figures of FIG. 1 show a separator set according to the invention. In FIG. 1:

FIG. 1a shows a cross section through a first separator for use in a method according to the invention.

FIG. 1b shows a cross section through a second separator for use in a method according to the invention.

FIG. 1c shows a cross section through a third separator for use in a method according to the invention.

FIG. 1d shows a cross section through a fourth separator for use in a method according to the invention.

FIG. 2 shows an enlarged detail of the separator shown in FIG. 1a, taken along line 2-2 of FIG. 1a.

DETAILED DESCRIPTION

Figure 2:
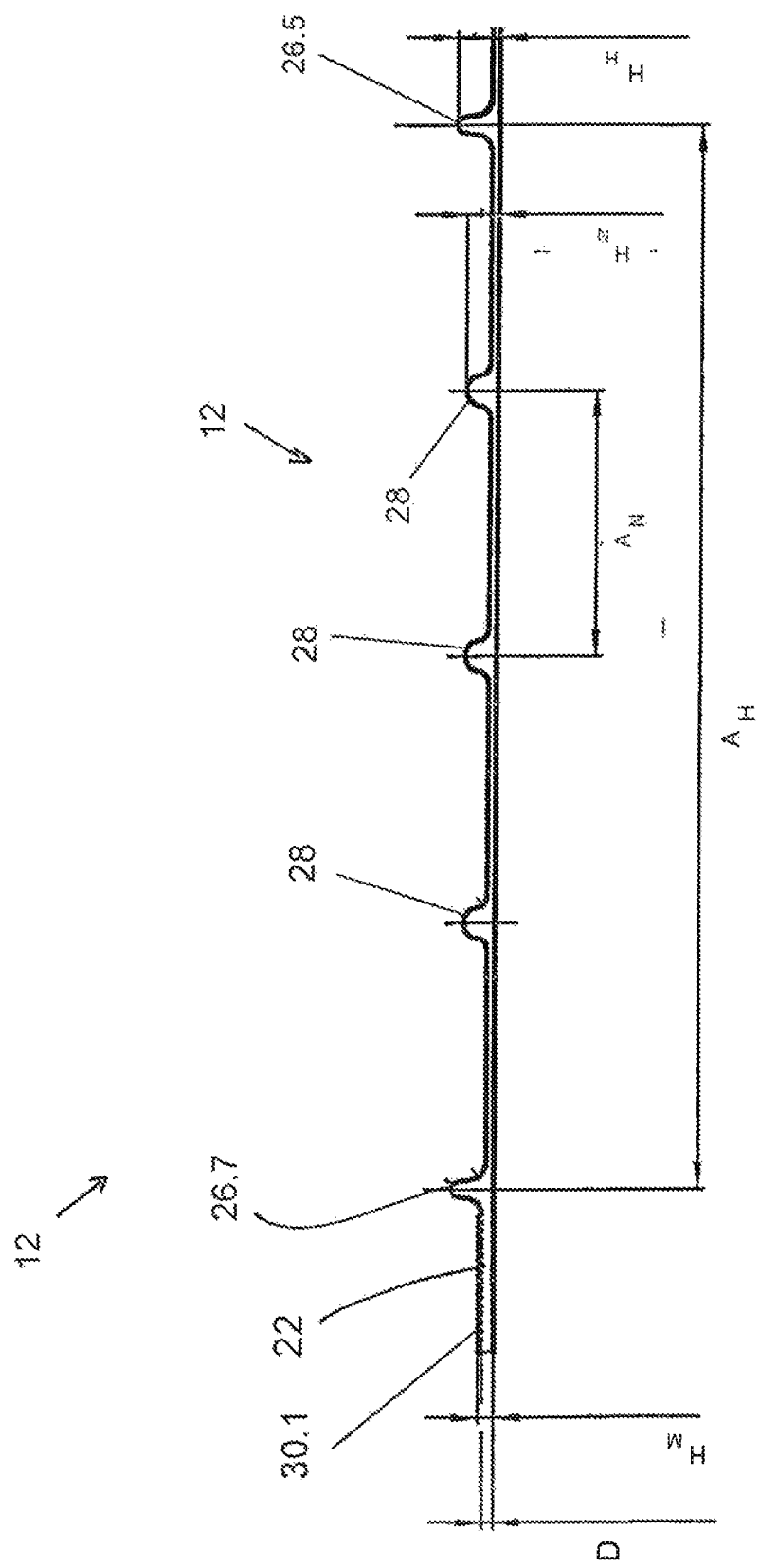

For the purposes of the present invention, a separator processing machine is defined as, in particular, a pocket machine which produces a separator pocket for a pole plate of a lead-acid rechargeable battery from a separator, which may be in the form of a web and is therefore also referred to as a separator web.

A center line of the separator M is defined as, in particular, the imaginary line which runs between two side edges 24.1, 24.2 of the separator 12, 14, 16, 18.

The feature that the main ribs 26 of the second separator 14 are arranged at the same points with respect to the center line M as the main ribs 26 of the first separator 12 therefore is defined as, in particular, that the main ribs 26 of the second separator 14 can engage in the same recesses 34 in a guide apparatus 32 of the separator processing machine as the main ribs 26 of the first separator 12.

A separator set 10 is defined as, in particular, a total of two, three or more separators 12, 14, 16, 18 which have the features as described herein with respect to one another. The separator set 10 can therefore also be referred to as a kit of separators.

FIG. 1 shows a separator set 10 which comprises a first separator 12, a second separator 14, a third separator 16 and a fourth separator 18. Referring specifically to FIG. 1a, the first separator 12 has a film base body 22 which extends along a longitudinal axis L which runs at right angles to the plane of the drawing. A center line M runs parallel to the longitudinal axis L centrally between a first edge 24.1 and a second edge 24.2. A first or central main groove or rib 26.1 runs on the center line M, which in FIG. 1a, for clarity reasons, is shown above its actual position through the film base body 22, and this first or central main groove or rib 26.1 projects above the film base body 22 by a main rib height $H_H$ (see FIG. 2).

Main ribs 26.2, 26.3, 26.4, 26.5, 26.6, 26.7 are arranged with mirror-image symmetry with respect to the center line M with a main rib separation $A_H$ (see FIG. 2). In other words, this means that the distance for example of the second main rib 26.2 from the central main rib 26.1 is precisely the same as the distance between the third main rib 26.3 and the central main rib 26.1.

A plurality of secondary ribs 28 are arranged on the film base body 22 between adjacent main ribs. For example, as shown in FIG. 1a, secondary ribs 28.1, 28.2, 28.3 are arranged between the main ribs 26.1 and 26.2. The secondary ribs 28 project above the film base body 22 by a secondary rib height $H_N$ (see FIG. 2). For example, the secondary rib height $H_N$ is preferably 600 μm.

A multiplicity or plurality of miniribs 30.1 and 30.2, project above the film base body 22 on both sides of the two outermost main ribs 26.6 and 26.7. The miniribs 30 project above the film base body 22 by a minirib height $H_M$ (see FIG. 2). For example, the minirib height $H_M$ is preferably 200 μm. The miniribs 30 extend at the edge over a minirib zone width $B_M$. For example, the minirib zone width $B_M$ of the first separator 12 is preferably 19.5 mm. A main rib zone in which there are only main ribs and secondary ribs extends between the two outermost main ribs 26.6, 26.7. The main rib zone has a main rib zone width of $B_H$. For example, the main rib zone $B_H$ is preferably 123 mm. Overall, the first separator 12 has a first separator width $B_1$. For example, the first separator width $B_1$, is preferably 162 mm.

FIG. 1b shows the second separator 14, which has main ribs 26.1, 26.2, 26.3, 26.4, 26.5, 26.6, 26.7 and secondary ribs 28, which are arranged at the same points with respect to the center line M as in the first separator 12. The reference signs without a numerical suffix in this case denote the respective object as such. The second separator 14 differs from the first separator 12 in that the minirib zone width $B_M$ is less. For example, the minirib zone width $B_M$ of the second separator 14 is preferably 14 mm, which results in a second separator width $B_2$ of preferably 151 mm.

FIG. 1c shows the third separator 16 which, in contrast to the first and the second separators 12 and 14, respectively, has only five main ribs 26.1, 26.2, 26.3, 26.4, 26.5, not seven. The main rib zone width $B_H$ is therefore less. For example, the main rib zone $B_H$ of the third separator 16 is preferably 82 mm. The minirib zone width $B_M$ is greater than the minirib zone width $B_M$ of the first separator 12 and second separator 14. For example, the minirib zone width $B_M$ of the third separator 16 is preferably 21 mm, which results in a third separator width $B_3$ of preferably 124 mm. The five main ribs 26.1 to 26.5 are arranged at the same points with respect to the center line M as the main ribs 26.1 to 26.5 of the first separator 12 and of the second separator 14.

FIG. 1d shows the fourth separator 18 of the separator set 10. This differs from the third separator 16 by having a narrower minirib zone width $B_M$. For example, the minirib zone width $B_M$ of the fourth separator 18 is preferably 19.5 mm, which results in a fourth separator width $B_4$ of preferably 121 mm.

The separators 12, 14, 16, 18 in a separator set 10 according to the invention preferably have a plurality of secondary ribs 28 which project above the film base body 20 by a secondary rib height $H_N$ along the center line M, which secondary rib height $H_N$ is less than the main rib height $H_H$, and are arranged between adjacent main ribs 26, and a plurality of miniribs 30 which project above the film base body 22 by a minirib height $H_M$ along the longitudinal axis L, which minirib height $H_M$ is less than the secondary rib height $H_N$, and are arranged at the edge beyond the main ribs 26 and secondary ribs 28. The provision of secondary ribs 28 and miniribs 30 leads to a particularly reliable separator. In this case, it is advantageous to design the guide apparatus of the separator coating machine to interact only with the main ribs 26. This means that the main rib 26 can engage in the recess 34, while in contrast there are no recesses in the guide apparatus 32 for the secondary ribs 28 and miniribs 30.

Each separator 12, 14, 16, 18 preferably has a central main rib 26.1 which is arranged on the center line. This means that the central main rib 26.1 is arranged centrally between two outer edges 24.1, 24.2 of the separator.

In one or more examples of embodiments, separators 12, 14, 16, 18 have a main rib height $H_H$ is preferably more than 600 μm and/or less than 1500 μm. The secondary rib height $H_N$ is preferably more than 450 μm and/or less than 600 μm. The minirib height $H_M$ is preferably more than between 200 μm and/or less than 300 μm.

A main rib separation $A_H$ between adjacent main ribs 26 for each separator 12, 14, 16, 18 is preferably less than 23 mm. This allows a multiplicity of different separator pocket widths to be produced. In other words, lead-acid rechargeable batteries can therefore be produced with a multiplicity of pole plate widths.

FIG. 2 shows a detail of the first separator 12 and the associated dimensions taken along line 2-2 of FIG. 1a. As can be seen, the film base body 22 has a film thickness D. For example, the film thickness D may range from 220 μm to 300 μm at the edge adjacent to the closest main rib 26.7. The main rib separation $A_H$ may preferably be less than 23 mm, and, for example, is approximately 20 mm. A secondary rib separation $A_N$ between adjacent secondary ribs may preferably be less than 10 mm, and is, for example, approximately 5 mm.

A particularly lightweight, material-saving and cost-effective separator set 10 is produced if each separator 12, 14, 16, 18 has less than thirteen main ribs 26, in particular less than eleven main ribs 26. It has been found that more main ribs 26 have a negative influence on the electrical characteristics of a lead-acid rechargeable battery produced with the separator. It is preferable for at least two secondary ribs 28 to be in each case arranged between two main ribs 26 for each separator.

In order to produce a separator pocket during the course of a production process for a lead-acid rechargeable battery, the first separator 12 is threaded into a separator processing machine according to the invention, in the form of a pocket machine. A pole plate is placed on the main ribs in the pocket machine. The first separator 12 is then folded in a plane parallel to the plane of the paper in FIG. 1a, and is knurled in the area of the miniribs 30. This results in an acid-tight separator pocket which surrounds the pole plate on three sides.

Figure 3:
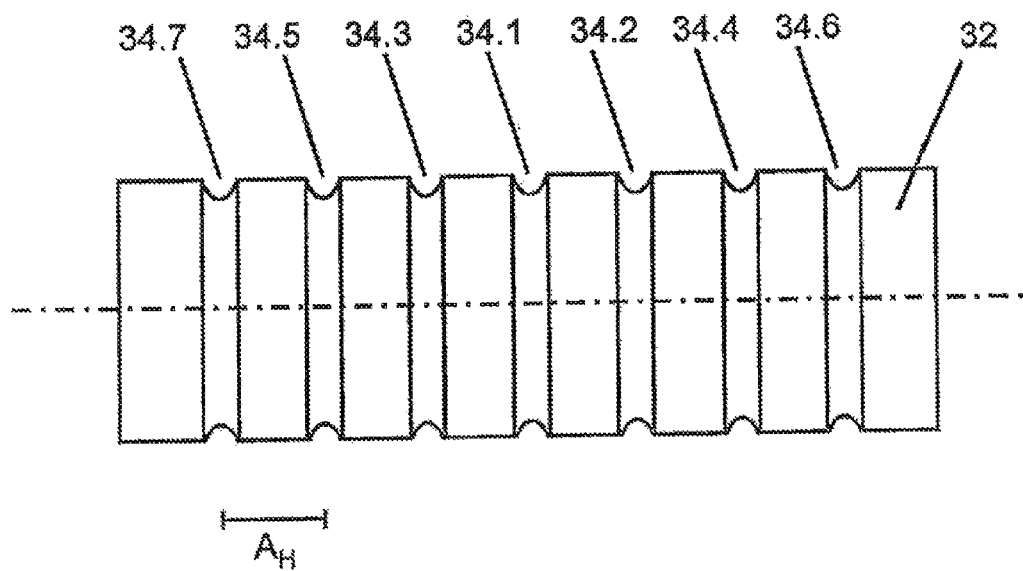
FIG. 3 shows a guide apparatus.

In order to allow this process to be carried out reliably, the separator processing machine has a guide apparatus 32, which is shown schematically in FIG. 3, in the form of a guide roller. The guide roller 32 has recesses 34.1, 34.2, 34.3, 34.4, 34.5, 34.6, 34.7 in the form of circumferential slots. The recesses 34 are separated from one another by the main rib separation $A_H$, as a result of which the main ribs 26 can engage in the recesses 34. By way of example, the first separator 12 is fed through the separator processing machine by the guide roller 32.

For example, in order to change to the second separator 14, the first separator 12 has to be unthreaded from the separator processing machine, and the second separator 14 threaded in. The main ribs 26 of the second separator 14 are arranged with respect to the center line M (see FIG. 1b) in the same way as the first separator (see FIG. 1a). At the same time, the main ribs 26 in all separators 12, 14, 16, 18 are symmetrical with respect to the center line M. The central main rib 26.1 therefore always engages in the recess 34.1. If a separator is used which has fewer main ribs than the first separator 12, for example the third separator 16 or fourth separator 18, then the guide roller 32 can nevertheless still be used since, in this case, only the two outermost recesses 34.6 and 34.7 fail to engage with anything.

The invention has the advantage that it allows the separator processing machine to be converted quickly. This is because all that is necessary is to unthread a first separator 12, 14, 16, 18 from the separator processing machine and to thread a second separator 12, 14, 16, 18 into the unchanged separator processing machine. There is no need to change the guide apparatus 34. This drastically reduces the shutdown times for converting the separator processing machine. A further advantage is that the advantages of the invention need not be at the expense of disadvantages. The functionality of the separators 12, 14, 16, 18 in the separator set 10 according to the invention are therefore equivalent to known separators in a lead-acid rechargeable battery.

According to one preferred embodiment, the guide apparatus 32 remains the same when carrying out a method according to the invention. In other words, the guide apparatus 32 is not changed, in particular is not removed or is not moved from an active position to a passive position.

After conversion, the separator 12, 14, 16, 18 is guided by the same guide apparatus 32 as before the conversion. This has the advantage that a considerable amount of working time is saved since the guide apparatus or the guide apparatuses 32 is or are generally arranged in an internal area of the separator processing machine, as a result of which access to it or them is difficult. There is therefore no need for the effort for changing or converting the guide apparatus 32.

The position of the at least one guide apparatus 32 relative to a separator path of the separator 12, 14, 16, 18 through the separator processing machine particularly preferably remains unchanged while carrying out a method according to the invention. In other words, the guide apparatus 32 need not be operated and/or changed when converting the separator processing machine, thus saving time and costs.

The invention claimed is:

1. A set of separators for separating opposite-polarity electrodes in a lead-acid rechargeable battery comprising:
   a plurality of separators in the separator set, the plurality of separators including;
   a first separator with a first separator width and a second separator with a second separator width which is different from the first separator width;
   each separator having a film base body which extends along a center line, and a plurality of main ribs which project above the film base body by a main rib height along the center line;
   wherein the main ribs of each separator are provided with mirror-image symmetry with respect to the center line, and
   the main ribs of each separator are provided at the same distance with respect to the center line.

2. The separator set of claim 1, wherein the separators of the separator set include:
   a plurality of secondary ribs which project above the film base body by a secondary rib height along the center line, wherein the secondary rib height is less than the main rib height, and are provided between adjacent main ribs; and
   a plurality of miniribs which project above the film base body by a minirib height along the center line, wherein the minirib height is less than the secondary rib height, and are provided at an edge of the film base body.

3. The separator set of claim 1 wherein a central main rib is provided on the center line of the separators.

4. The separator set of claim 1 wherein a main rib separation between adjacent main ribs of the separators is less than 23 mm.

5. The separator set of claim 1 wherein the separators have fewer than 13 main ribs.

6. The separator set of claim 2 wherein at least two secondary ribs are provided between two adjacent main ribs for the separators.

7. The separator set of claim 2 wherein one main rib is provided adjacent to the miniribs for the separators.

8. The separator set of claim 1, further comprising a separator processing machine including a guide apparatus for guiding the separators of the separator set, wherein the guide apparatus has recesses for at least one of the main ribs of the separators to engage in.

9. The separator set of claim 8, wherein the separator processing machine is adapted to produce a separator pocket from the separator, and the guide apparatus is a guide roller.

10. The separator set of claim 1, wherein the separators have fewer than eleven main ribs.

11. The separator set of claim 1, wherein the separators have between four and ten main ribs.

* * * * *